(12) United States Patent
Beveridge et al.

(10) Patent No.: US 12,105,681 B2
(45) Date of Patent: Oct. 1, 2024

(54) AUTOMATIC DOCUMENT HANDLING WITH ON-DEMAND APPLICATION MOUNTING

(71) Applicant: VMware, Inc., Palo Alto, CA (US)

(72) Inventors: Daniel James Beveridge, Apollo Beach, FL (US); Fei Huang, San Jose, CA (US); Matthew Conover, Mountain View, CA (US)

(73) Assignee: Omnissa, LLC, Palo Alto, CA (US)

( * ) Notice: Subject to any disclaimer, the term of this patent is extended or adjusted under 35 U.S.C. 154(b) by 0 days.

(21) Appl. No.: 15/188,991

(22) Filed: Jun. 22, 2016

(65) Prior Publication Data
US 2017/0371519 A1    Dec. 28, 2017

(51) Int. Cl.
| G06F 16/188 | (2019.01) |
| G06F 8/61 | (2018.01) |
| G06F 9/445 | (2018.01) |
| G06F 9/455 | (2018.01) |
| G06F 16/16 | (2019.01) |

(52) U.S. Cl.
CPC ............. *G06F 16/188* (2019.01); *G06F 8/61* (2013.01); *G06F 9/445* (2013.01); *G06F 9/45533* (2013.01); *G06F 9/45558* (2013.01); *G06F 16/168* (2019.01); *G06F 2009/45583* (2013.01)

(58) Field of Classification Search
CPC ........... G06F 3/04817; G06F 17/30126; G06F 17/30233; G06F 8/61; G06F 9/445; G06F 9/45533; G06F 9/45558; G06F 2009/45583
See application file for complete search history.

(56) References Cited

U.S. PATENT DOCUMENTS

| 8,626,723 B2 | 1/2014 | Ben-Shaul et al. |
| 10,182,103 B2* | 1/2019 | Koushik .................. H04L 67/10 |
| 2007/0192329 A1* | 8/2007 | Croft ...................... G06F 3/1415 |
| 2011/0126192 A1* | 5/2011 | Frost ......................... G06F 8/61 |
| | | 717/178 |
| 2011/0173251 A1* | 7/2011 | Sandhu ..................... G06F 8/61 |
| | | 709/203 |
| 2011/0209064 A1* | 8/2011 | Jorgensen ................. G06F 9/54 |
| | | 715/733 |
| 2011/0251992 A1* | 10/2011 | Bethlehem .......... H04L 12/2863 |
| | | 707/610 |

(Continued)

OTHER PUBLICATIONS

Tristan Todd, VMware App Volumes Deployment Guide, 2015, VMware App vols. 2.5.*

(Continued)

*Primary Examiner* — Jennifer N Welch
*Assistant Examiner* — Amy P Hoang
(74) *Attorney, Agent, or Firm* — Kim & Stewart LLP (57) ABSTRACT

Embodiments perform automatic document handling by retrieving icons from local document handlers or from an application volumes manager, without installing the application locally. Embodiments further perform on-demand application mounting by intercepting and suspending requests to launch applications until the appropriate virtual disk, corresponding to the application, is mounted to the disk subsystem by the application volumes manager. The application launch is then resumed.

20 Claims, 9 Drawing Sheets

(56) References Cited

U.S. PATENT DOCUMENTS

| | | | |
|---|---|---|---|
| 2012/0054625 A1* | 3/2012 | Pugh | G06F 21/41 |
| | | | 715/736 |
| 2012/0174096 A1 | 7/2012 | Conover | |
| 2013/0104125 A1* | 4/2013 | Sarma | G06F 9/45558 |
| | | | 718/1 |
| 2014/0245286 A1* | 8/2014 | Wong | G06F 8/62 |
| | | | 717/174 |
| 2014/0282623 A1* | 9/2014 | Conover | G06F 9/542 |
| | | | 719/318 |
| 2015/0012703 A1* | 1/2015 | Ashok | G06F 9/45558 |
| | | | 711/114 |
| 2015/0074116 A1 | 3/2015 | Huang | |
| 2015/0121059 A1 | 4/2015 | Davis | |
| 2016/0112497 A1* | 4/2016 | Koushik | G06F 8/61 |
| | | | 726/7 |
| 2018/0075060 A1* | 3/2018 | Mi | G06F 16/183 |

OTHER PUBLICATIONS

VMware, Inc., VMware App Volumes User's Guide, 2014, VMware App vols. 2.5.*

Unknown, "ThinApp: Overview and Features", VMware, Inc., Copyright 2016, http://www.vmware.com/products/thinapp/, 6 pages.

Unknown, "App Volumes: Overview and Features", VMware, Inc., Copyright 2016, https://www.vmware.com/products/appvolumes, Overview and Features, 9 pages.

Unknown, "Application Virtualization", Microsoft, Inc., Copyright 2016, https://technet.microsoft.com/en-us/windows/hh826068, 2 pages.

* cited by examiner

AUTOMATIC DOCUMENT HANDLING WITH ON-DEMAND APPLICATION MOUNTING

BACKGROUND

Some existing operating systems present files for which an appropriate handler application is not installed. These files are often represented to users with icons not associated with the handler application, such as a grayed out rectangle, indicating to the user that the application is not installed. In traditional Information Technology (IT) environments that are managed, users must request access to the handler application and then wait for IT to respond. In self-service environments, users must manually identify, locate, and install the handler application themselves. Traditional approaches to solving this problem involve transferring copies of application binaries from their source location, across the network, and onto the local drive of the target physical or virtual machine.

Most virtualized application solutions offer an entitlement mechanism which IT uses to specify which applications (including handling applications) a given user or group of users may access. Based upon a user's entitlement, the applications are installed on the user's desktop in some manner. Traditional installer-based software distribution systems perform a traditional software install either at first login or during a maintenance window. This approach ties up valuable licenses, including licenses for handler applications that the user may never use.

Virtual desktop designs that implement 'stateless desktops' attempt to keep the operating system (OS) container largely devoid of personalization so that it can be deployed to any user and can be easily recycled between users after a given desktop session concludes. Delivering applications (including handler applications) into such a stateless design is challenging because of the work necessary to personalize the OS at user login time. Typically, some type of network streaming is used to deliver the application binaries or some portion thereof down to the user upon login. This often creates significant delays leading to user dissatisfaction and creates significant load on storage and central processing unit (CPU) systems.

Another approach is to represent application icons on the user desktop but deliver all content from a network share upon demand. This approach suffers from poor launch time performance, often as much as five times longer than launching from a non-network block based storage resource attached to the virtual desktop, with some existing systems.

SUMMARY

One or more embodiments described herein a system and method for a system for on-demand application mounting on a machine. An applications manager filter driver intercepts or receives a request relating to a file with an unmounted document handler. The request is suspended, while an application volume manager identifies the unmounted document handler, and mounts the appropriate virtual disk or application stack corresponding to that document handler to the disk subsystem of the requesting machine. The request is then resumed.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein allow a user, at login time, operating a virtual machine (VM) or a physical machine to see a set of applications, mounted or not, available to the desktop based upon applications IT has pre-entitled. Not all applications need be mounted to the VM at the time of user login. In some systems, a class of applications is flagged as 'mount-on-demand.' As an example, applications with a limited number of licenses, applications which consume a large quantity of resources, applications which are time-consuming to mount are classified as mount-on-demand to conserve resources such as bandwidth, storage space, and processing capacity. Users are entitled to access the mount-on-demand applications, but the applications are represented to the OS as one or more program icons on the user's start-menu or desktop, instead of as fully mounted or installed, in some examples. In this manner, aspects of the disclosure reduce the resource penalties imposed by existing systems on underlying infrastructure, leading to reduced datacenter load and latency in the user experience.

In addition to the applications explicitly entitled to a given user or group, IT can make a secondary entitlement to a secondary ring of application, such as document handlers. Document handlers are parent applications needed to open and edit a document of a given extension encountered by users during their work activities. Traditionally, a document without a document handler application appears as a blank white icon in the WINDOWS operating system, signifying that the operating system does not know how to process such a document. A double-click on such an unhandled document type results in the operating system prompting the user to select a document handler for the document.

Upon first use or first launch of a mount-on-demand application, a filter driver intercepts the launch event, and signals an application volumes manager to mount the requested application, and continue the actual launch once the mount has completed. The application volumes manager and the filter driver are part of a system for application delivery and lifecycle management. This mount-on-demand approach only introduces a modest latency to the user experience of around 1-2 seconds, in some examples.

The mount-on-demand model includes a reduction in the number of applications which must be mounted to the user's virtual desktop upon login, speeding completion of the login and reducing the work performed in the datacenter. Any given user may be entitled to a significant number of applications (e.g., twenty), but in a given virtual desktop infrastructure (VDI) session, they are likely to only use a subset of these (e.g., four). In this example, rather than the application volumes manager performing twenty virtual disk mount operations upon user login, only the applications that must be mounted prior to launch are mounted at login. Such applications are a minority of applications, so the mount-on-demand approach represents a meaningful reduction of work for application volumes to perform at login and a faster user experience.

Under the disclosed system and method, the hypervisor (or OS) mounts a virtual disk to either a virtual or physical machine. In the virtual case, the hypervisor does the work by adding a virtual disk to the virtual machine which the operating system recognizes as a new disk. The contents appear immediately in the file system, configuration data, or registry, but no contents are actually copied to that location. In some examples, only when users attempt to access that content does the transfer occur.

The application volumes manager leverages this quick mount architecture to rapidly make large amounts of content available to the operating system without the need to transfer it into the local drive ahead of consumption. An application volumes agent detects the mounting event and merges the application contents present on the mounted volume into the file system and configuration data of the OS as though it were actually present in the proper locations on the local drive had it been installed with a traditional installer.

The disclosed method is easier to manage than existing methods, because it is only necessary to install one copy of an application, update and upgrade the application from a single place, in some examples. Storage cost savings accrue as the application needs only to be stored in a virtual disk (such as AppStacks, by VMware, Inc.). The applications are deployed more quickly, permitting deployment within seconds to thousands of users or computers. Users can choose the applications they want to use and when they want to use them, providing enterprises with more efficient deployments. Further, mounting applications through the application volumes manager allows administrators to easily expand or contract the enterprise environment on demand, deploying applications to thousands of stateless servers within seconds. Additionally, applications are no longer tied to a particular computer or virtual machine. If there is a failure, users can easily move a workload to any available stateless server and within seconds it is up and running again.

The application volumes manager leverages a zero-copy strategy which represents the application as present to the OS, by merging metadata about the location of configuration data, registry, and file contents into the file system and configuration data of the OS. In some examples, very little information is transferred prior to application launch. This leads to fast application insertion (e.g., only a few seconds) and exponentially reduced datacenter load for scale operations across many virtual desktops. While described in the context of application volumes and application stacks, aspects of the disclosure are operable with any form of mountable volumes having zero-copy features.

Figure 1:
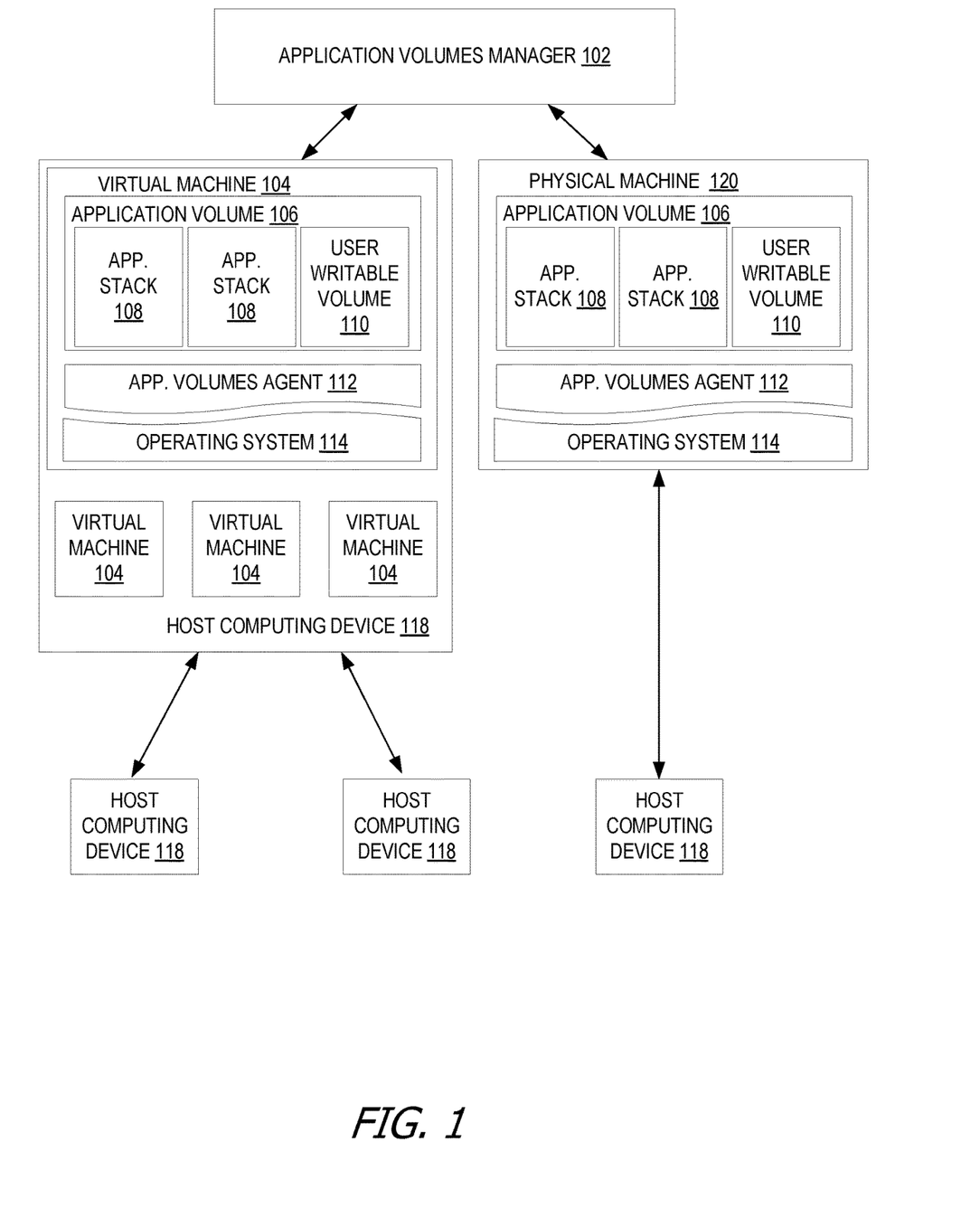
FIG. 1 is a block diagram of an exemplary system for implementing automatic document handling with on-demand application mounting.

FIG. 1 is a block diagram of an exemplary system for implementing automatic document handling with on-demand application mounting. In the example of FIG. 1, users (not illustrated) operate host computing devices 118. The system can be utilized for both physical machines 120 such as laptops, tablets, and desktops, and also virtual desktops or virtual machines (VMs) 104. The host computing devices 118 are communicatively connected to their respective types of desktops. In the example of virtual desktops, the host computing devices 118 communicate with a second host computing device 118, which operates a number of VMs 104. In either example, the VMs 104 and the physical machine 120 are communicatively connected to the application volumes manager 102.

The application volumes manager 102, such as App Volumes, by VMware, Inc., administers and configures the application volumes 106. The application volumes manager 102 assigns application stacks 108, such as AppStacks by VMware, Inc. or virtual disks, and user writable volumes 110. The application volumes manager is also used as a broker for the application volumes agents 112, and for automated assignment of applications and user writable volumes 110 during desktop startup and/or user login. As illustrated in FIG. 1, each VM 104 includes an application volume 106 composed of application stacks 108 and user writable volumes 110.

The application stacks 108 are mountable, read-only volumes containing any number of applications. Multiple application stacks 108 can be mapped to an individual system or user. An individual application stack 108 can also be mapped to more than one system or user. The user writable volumes 110 are user-specific volumes where the user is allowed to preserve data. As an example, user writable volumes 110 can be used to store user-installed applications and local profile information, such as application settings, application licensing information, and data.

The application stacks 108 are layered with the application volumes agent 112 and the operating system (OS) 114, as part of the composition of a VM 104 or physical machine 120. The application volumes agent 112 is installed on all desktops where users receive application stack volumes and writable volume assignment. The application volumes agent 112 runs as a service and utilizes an application volumes filter driver (not illustrated) to handle application calls and file system redirects to application stack and writable volume virtual machine disks (VMDKs). Machines 206 do not have to be members of the domain on which the application volumes manager server resides. The application volumes agent 112 is able to roam user state between VMs by using VMDK mount to present a user state to a target VM at the time of user login, and to merge the mounted information (mounted at login, or upon demand) into the OS at the expected locations using its full file system and registry virtualization drivers. In this manner, the application contents appear as though they were actually present in the proper locations on a local drive (e.g., as though they been installed with a traditional installer application).

The application volumes agent 112 delivers applications rapidly to physical or virtual desktops by way of mounting a virtual disk, such as the virtual disks associated with application stacks 108, to a running OS. Upon mounting the virtual disk under the OS (performed by the hypervisor to plug in new virtual hardware, or by the OS using the VHD mount), a plug and play event occurs and the application volumes agent 112 (e.g., a virtualization driver that represents data from the mounted disk into the expected location) in the OS examines a mapping file (e.g., resident in the root of the disk) to know where to represent the content from the disk (e.g., falsify the location so that it appears to be present natively in the registry or other configuration file). The application volumes agent 112 further delivers applications, in real-time, rapidly to physical or virtual desktops by way of mounting a virtual disk to a running operating system. The application volumes agent 112 places application management containers above the OS. Applications, data files, settings, middleware, and configurations act as separate, layered containers. The applications may be made accessible to a VM 104 by mounting the virtual disk, rather than by installing the applications. These may be referred to as the application stacks 108 when in read-only mode, or user writable volumes 110 when in read-write mode.

Figure 2:
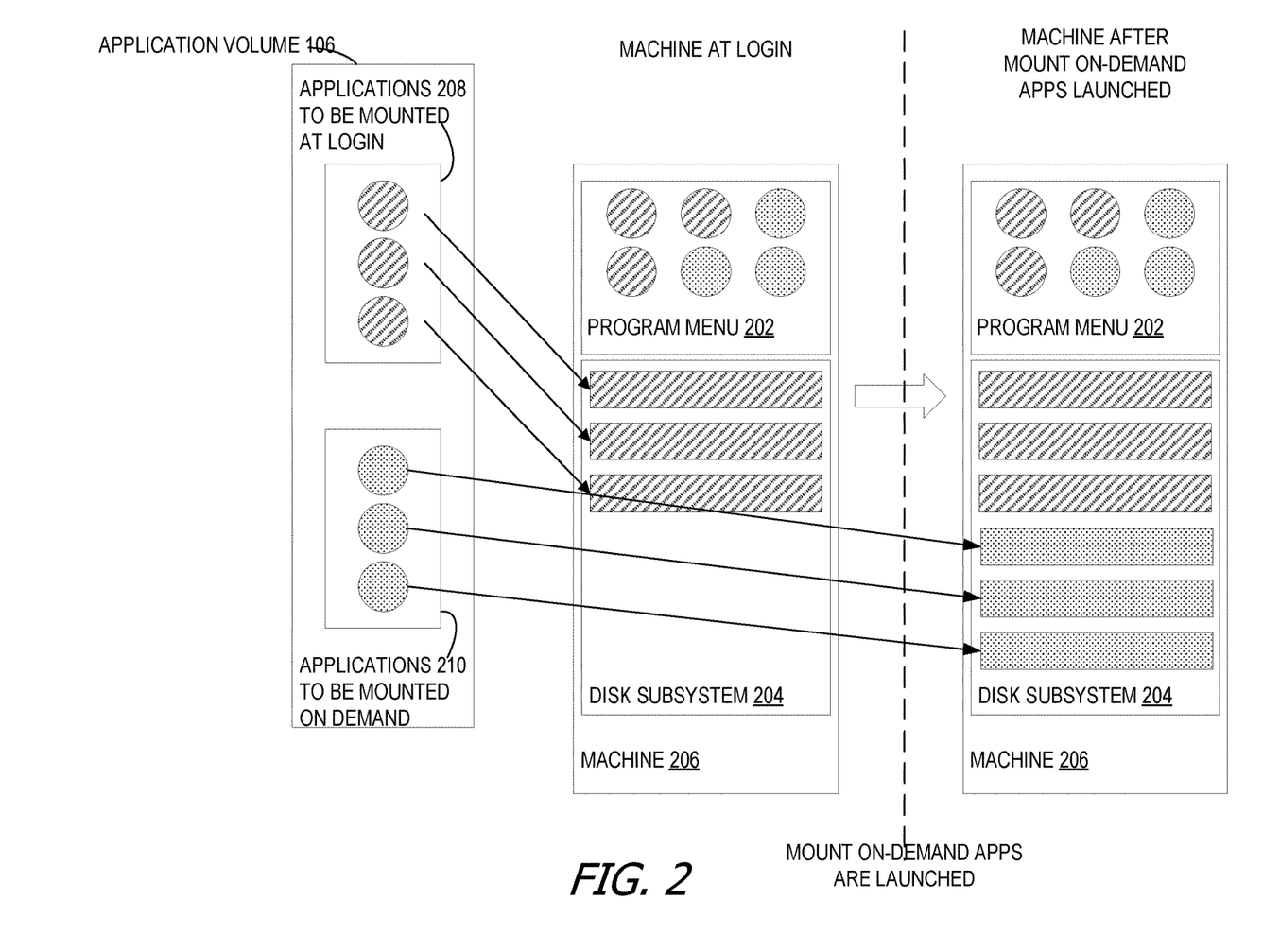
FIG. 2 is a block diagram of an exemplary virtual desktop, and the available applications, at login and after an on-demand application is launched.

FIG. 2 is a block diagram of an exemplary virtual desktop, and the available applications, at login and after an on-demand application is launched. The machines 206, which are either VMs 104 or physical machines 120, illustrated in FIG. 2 utilize the disclosed automatic document handling and on-demand application mounting disclosed herein. In the example of FIG. 2, the application volumes includes two types of applications, applications 208 which are mounted at login and applications which are mounted upon demand 210. Applications 208 which are mounted at login are illustrated with a diagonal line pattern, while mount-on-demand applications are illustrated with a dotted pattern. Applications which must have elements running in the OS prior to launch such as drivers or services cannot be flagged as 'mount-on-demand' within the application volumes manager since they have elements that must be active prior to launch. In the example of FIG. 2, the state of the machine 206, its disk subsystem 204, and the program menu 202 are illustrated at two separate times: upon user login on the left, and upon launch of an on-demand application on the right. While the program menu 202 is illustrated in this example, it is understood that the files associated with the various applications are displayed in other locations. As an example, files associated with an application, or the application itself, is displayed on a desktop, in a file system explorer tool, as an attachment in an email, as a downloadable file on a website, etc.

Figure 6:
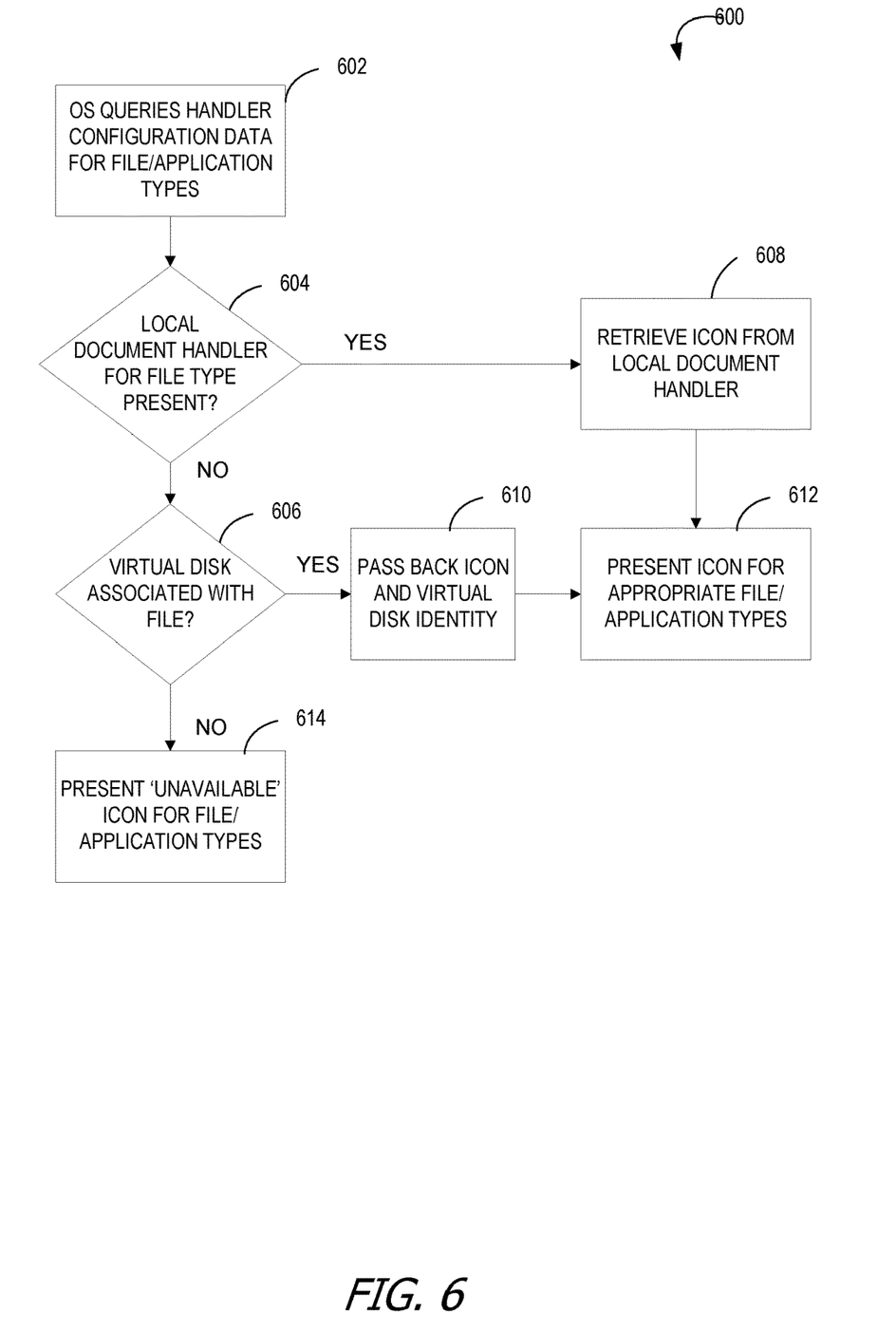
FIG. 6 is a flowchart of an example of automatic document handling.

The first illustration of the machine 206, on the left, is at login or boot up. In that illustration, only the application stacks 108 associated with the mount at login applications 208 are mounted to the disk subsystem 204. Mounting of the application stacks 108 to the disk subsystem 204 is described more fully, above. However, even though they are not yet mounted, the both the mount-on-demand applications 210 and the mount at login applications 208 (which are already mounted) are displayed with the appropriate icon on the program menu 202, or in any other location where the file type associated with the application is displayed. The method enabling this automatic document handling and display of appropriate icons is illustrated in FIG. 6 and described below.

The second illustration of the machine 206 in FIG. 2, on the right, is after the mount-on-demand applications 210 are launched. In the illustrated example, all of the mount-on-demand applications 210 are launched. However, the mount-on-demand applications 210 are mounted in response to an intercepted request to use a file relating to an unmounted application, and all of the mount-on-demand applications 210 need not be launched simultaneously. Some examples of request to use a file include: downloading the file, opening the file, opening the application, accessing an attribute of the file, right-clicking on the file, or printing the file. In the illustrated example, after the mount-on-demand applications are launched, the application stacks 108 associated with the mount-on-demand applications 210 are mounted to the disk subsystem 204. The mount-on-demand applications 210 are available for use after the mounting is complete.

Figure 3:
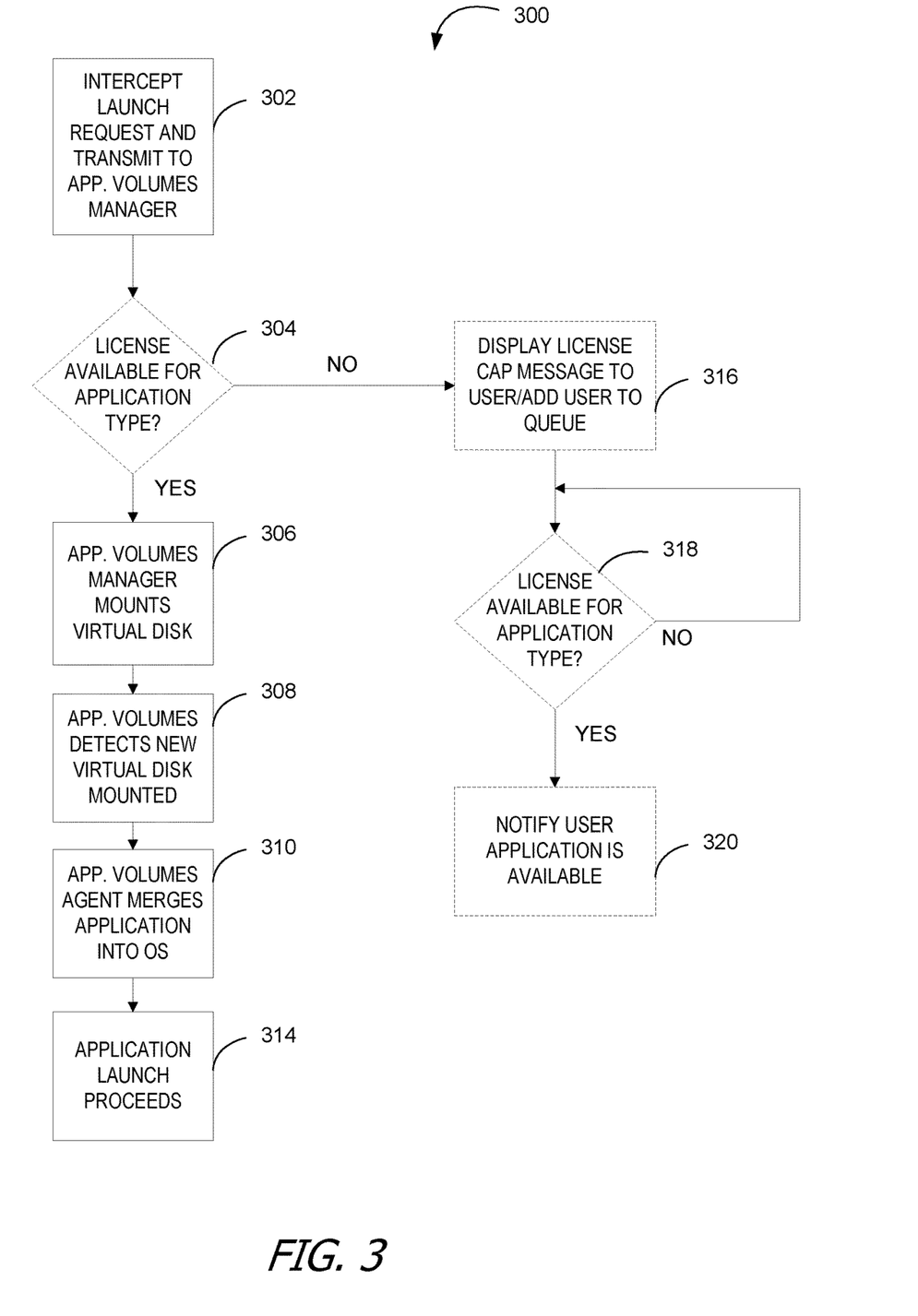
FIG. 3 is a flowchart of an example of the method for mounting an on-demand application.

FIG. 3 is a flowchart of an example of the method for mounting an on-demand application. At 302 a request to launch an on-demand application 210 is intercepted by the application volumes filter driver, and the request is transmitted to the application volumes manager 102. Optionally, at 304, the application volumes manager 102 verifies that a license is available for the launched application type at 304. In other examples, the application volumes manager 102 calls, via application program interface (API), to an external software asset inventory system to verify license availability. Monitoring requests to launch an on-demand application 210, and only launching the application upon demand, maintains the license count where at an absolute minimum, because mounted on-demand applications 210 are only logically installed by application volumes 106 onto the machines 206 where it is actually being consumed. If at 304 a license is available, then the application volumes manager 102 mounts the virtual disk or application stack 108 to the disk subsystem 204. At 308 application volumes 106 detects that a new application stack 108 or virtual disk has been mounted, and in response the application volumes agent 112 merges the new application stack 108 into the OS 114 at 310. The application volumes agent 112 merges the application contents present on the mounted volume or application stack 108 into the configuration data, file system, or registry of the OS as though it were actually present in the proper locations on the local drive as if it had been installed with a traditional installer. At 314 the launch of the mounted on-demand application 210 continues.

Alternatively, at 304, in the optional example where licenses pools are maintained, if no licenses for the launched mounted on-demand application 210 are available, the mount of the virtual disk or application stack 108 fails, and a license cap message is displayed to the user at 316. In some instances, the user is added to a queue at 316, and when a license for the requested mount-on-demand application 210 becomes available at 318, the user is notified that the application may be launched at 320. A privileged user with a license, in some examples, has no limitation on the duration of his license. Alternatively, the license is returned after a period of time, designated in some examples by a policy or an administrator.

In some examples, an application or file type may be unavailable to the user locally, or on application stacks 108. As an example, a user downloads a file from an email or website, and the user does not have access to the application. In that example, a standard dialog box opens to prompt the user to choose an application, or alternatively, the user receives an error message indicating that the required application is unavailable.

Figure 4:
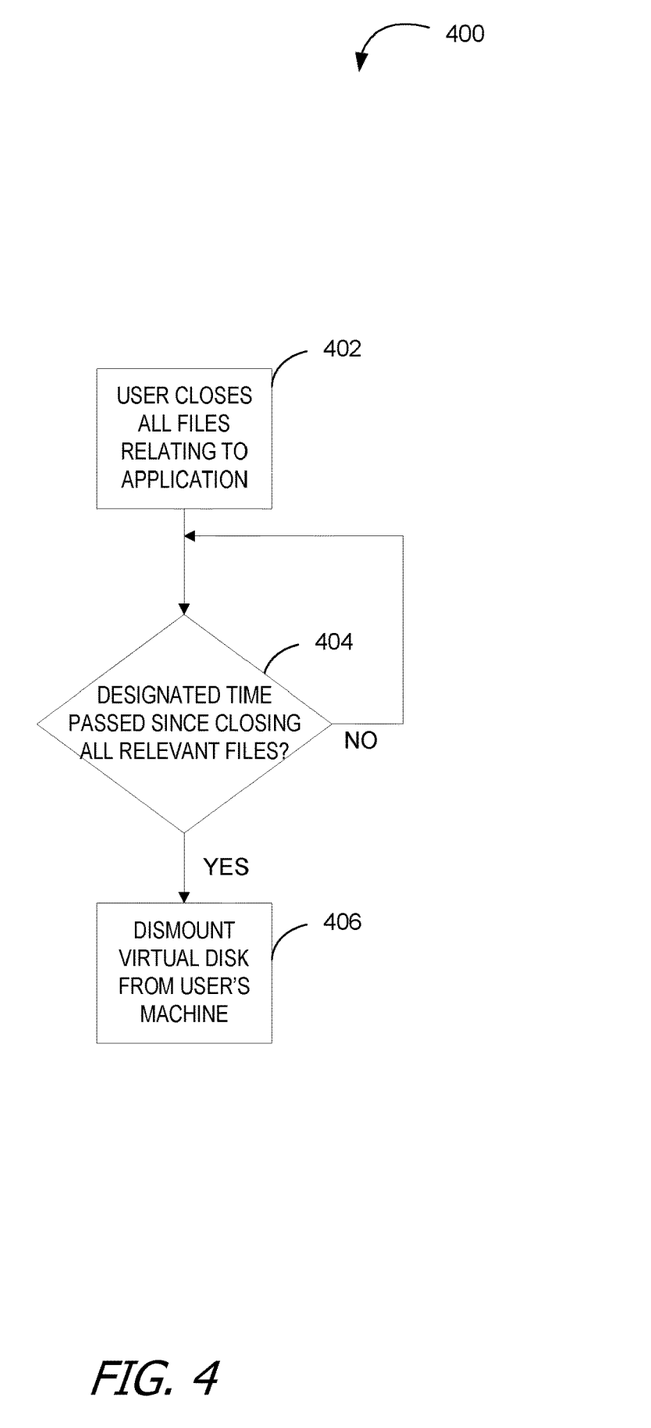
FIG. 4 is a flowchart of an exemplary method for managing licenses as applications are no longer needed during automatic document handling with on-demand application mounting.

FIG. 4 is a flowchart of an exemplary method for managing licenses as applications are no longer needed during on-demand application mounting. As an example, policies are federated to application volumes agent 112, by way of the application volumes manager 102, to dictate when a mount-on-demand application 210 is dismounted from the disk subsystem 204.

In the illustrated example, at 402 a user closes all file types which rely upon a mounted on-demand application 210. The application volumes agent 112 monitors the user, to evaluate the time lapse between the closing of the last file relating to the mounted on-demand application 210. In accordance with a policy federated to the application volumes agent 112, once the prescribed amount of time (e.g. eight hours) has elapsed after closing the last file related to the mounted on-demand application 210 at 404, the mount-on-demand application 210 is dismounted from the disk subsystem 204 of the user's machine 206. This is one example of how a feedback loop is utilized to minimize the number of application licenses required, and to most efficiently apportion the available licenses in a license pool. Even after dismount, the application and its associated files would still appear to the user as though they are installed, in accordance with the automatic document handling illustrated in FIGS. 6 and 7 and described in the associated text.

Other policies, as established by an administrator, govern the dismounting of mount-on-demand applications 210. As an example, mount-on-demand applications 210 are dismounted at a certain time of day (e.g., a shift change), after a user has been logged in for a prescribed amount of time (to prevent overtime accumulation), upon an application becoming idle for more than a threshold amount of time, etc.

In some embodiments, the usage patterns of users or groups of users are recorded and processed with machine learning technologies or components. As an example, the time a virtual disk is mounted and dismounted is recorded. If a pattern is identified in the mounting and dismounting pattern, the virtual disk or application stack 108 is mounted in anticipation of a request to open the file type or application which provides a use experience with less delays. Similarly, licenses are reserved in anticipation of mounting the virtual disk or application stack 108 associated with an application. In some examples, the trained machine learning component (not illustrated) comprises software stored at memory 804 and executed at processor 802. In some examples, the trained machine learning component is a field-programmable gate array (FPGA) or a dedicated chip. For example, the functionality of the trained machine learning component is implemented, in whole or in part, by one or more hardware logic components. For example, and without limitation, illustrative types of hardware logic components that can be used include FPGAs, Application-specific Integrated Circuits (ASICs), Application-specific Standard Products (ASSPs), System-on-a-chip systems (SOCs), Complex Programmable Logic Devices (CPLDs), Graphics Processing Units (GPUs).

The trained machine learning system takes raw application operation and execution data as input and determines an appropriate policy for the unknown application. The machine learning system is trained using pairs of known application operation and execution data and corresponding policies. A trainer accesses training data and uses that to train and produce the trained machine learning system, such as a random decision forest, a convolutional neural network, a support vector machine or other trained regressor. The type of training data used to train the machine learning system corresponds with the type of data input to the machine learning system at test time. Test time is the time in which the machine learning system is operational to compute output from previously unseen data.

Figure 5:
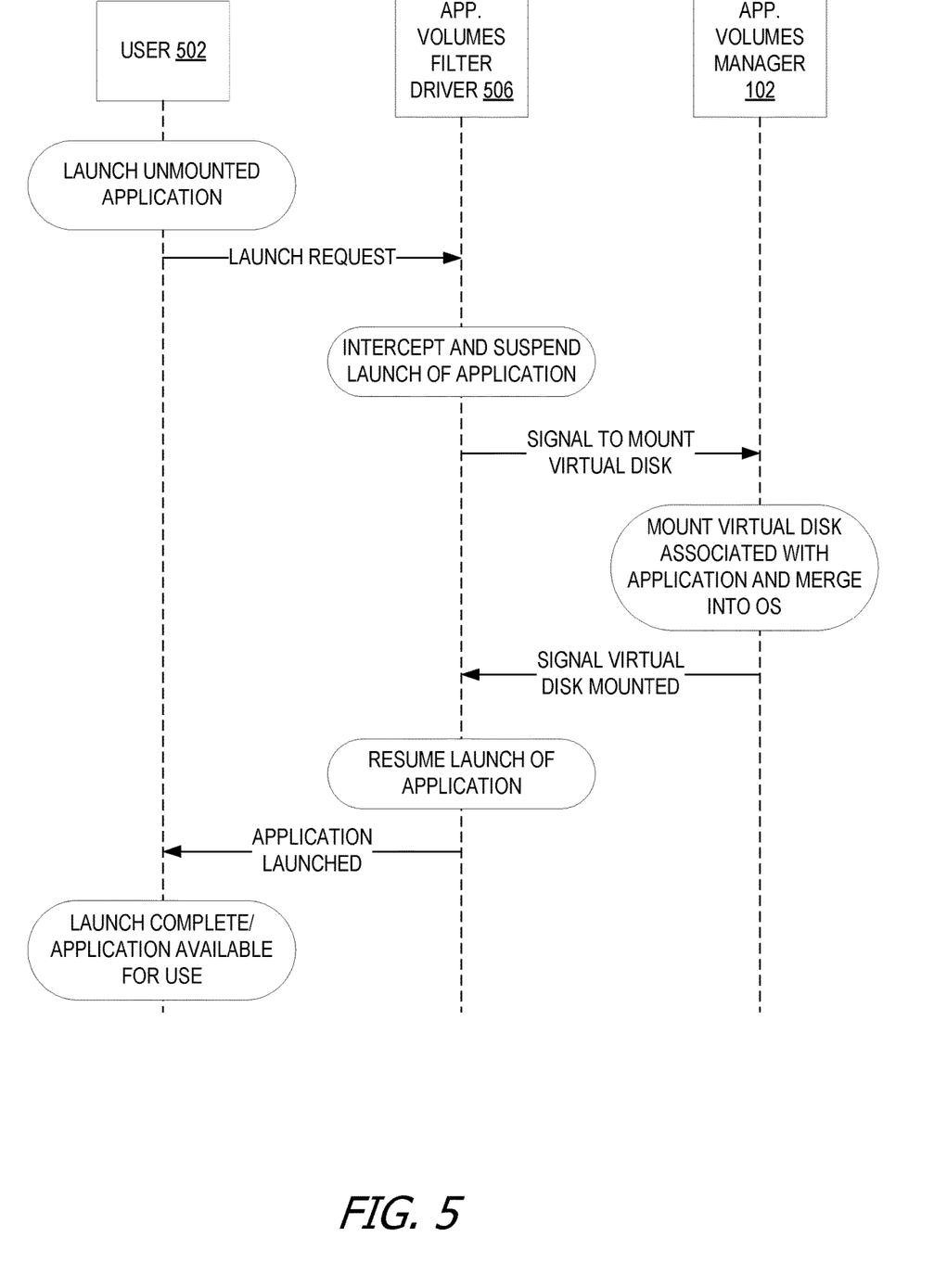
FIG. 5 is a sequence diagram illustrating the interaction of a user, an application volumes filter driver, and an application volumes manager during on-demand application mounting.

FIG. 5 is a sequence diagram illustrating the interaction of a user, the application volumes filter driver, and the application volumes manager during on-demand application mounting. Mounting on-demand applications 210 begins when the user 502 launches an unmounted application or a file type associated with an unmounted application. The launch request is intercepted by the application volumes filter driver 506. Upon intercepting the request, the application volumes filter driver 506 interrupts, suspends, or otherwise pauses the launch and determines that the application is unmounted. The application volumes filter driver 506 identifies the type of application associated with the file type or application, and signals to the application volumes manager 102 to mount the virtual disk or application stacks 108 associated with the application type. The application volumes manager 102 mounts the correct virtual disk or application stacks 108 to the disk subsystem 204, and merges it into the OS 114. The application volumes manager 102 indicates to the application volumes filter driver 506 that the virtual disk or application stacks 108 associated with the mount-on-demand application 210 is mounted to the disk subsystem 204. The application volumes filter driver 506 resumes, un-pauses, or otherwise restarts the launch of the now mounted mount-on-demand application, and the mount-on-demand application 210 is available for the user 502. This provides access to the mount-on-demand application 210 to any file type which utilizes that application.

FIG. 6 is a flowchart of an example of automatic document handling. Automatic document handling enables all applications, whether mount at login applications 208 or mount-on-demand applications 210 to be represented to the user 502 as "available." In some operating systems, representing applications or file types, are represented as a white or grayed-out rectangle if the associated application is not available to the operating system. The current method enables all files and applications that are accessible to a user to be displayed with the appropriate icon. Although the disclosed method may be described in the context of a particular operating system, it is contemplated that the disclosed document handling system and method applies to any operating system including WINDOWS brand operating systems, LINUX brand operating systems, SOLARIS brand operating systems, NETWARE, FREEBSD, or any other operating system which utilizes document handlers.

The illustrated method is performed at boot up, or at user 502 login. At 602, the OS queries the handler configuration data for local document handlers related to all of the file types or applications presented to the user 502. As an example, all file types or applications which a user 502 maintains on his start menu, desktop, etc. are part of the query to the handler configuration data. If a local document handler is present on the handler configuration data at 604, then the icon associated with the application is obtained or retrieved from the local document handler or the applications volume manager and returned to the operating system for display to the user 502. At 612, the retrieved or passed back icon is presented or displayed for all file types or applications associated with the retrieved icon. As an example, if the file type is an EXCEL file, then all file types associated with EXCEL are displayed with the EXCEL icon after it is retrieved from the local document handler.

Alternatively, if the local document handler for the file type or application is not in the handler configuration data at 604, then the operating system queries the application volumes manager 102 to determine if there is an application stack 108 or virtual disk associated with the file type or application at 606. If no application stack 108 or virtual disk is associated with file type of application, then an icon representing that the file type or application is unavailable is presented to the user 502 (e.g., grayed or whited out rectangle in WINDOWS operating systems) at 614. However, if there is a virtual disk or application stack 108 associated with the file type or application at 606, then the application volumes manager 102 passes back to the operating system 114 the appropriate icon, and the identity of the virtual disk or application stack 108 at 610. The file type or application is then represented to the user 502 with the appropriate icon at 612.

In some examples, multiple different types of icons are available to present or display to a user for a given file type or application. For instance, if the application is available and mounted, the typical icon is displayed, or any first application-specific icon. If the application is available but not mounted, a second application-specific icon, such as a grayed out version of the typical icon, is displayed. This second application-specific icon may be a representation of the first application-specific icon with a graphical overlay representing the "available but unmounted" state, such as a small symbol in the top left of the icon overlaid on the normal icon and understood to represent the state of availability. Finally, if the application is unavailable or unhandled, a third icon, such as the traditional grayed out rectangle, is displayed.

Figure 7:
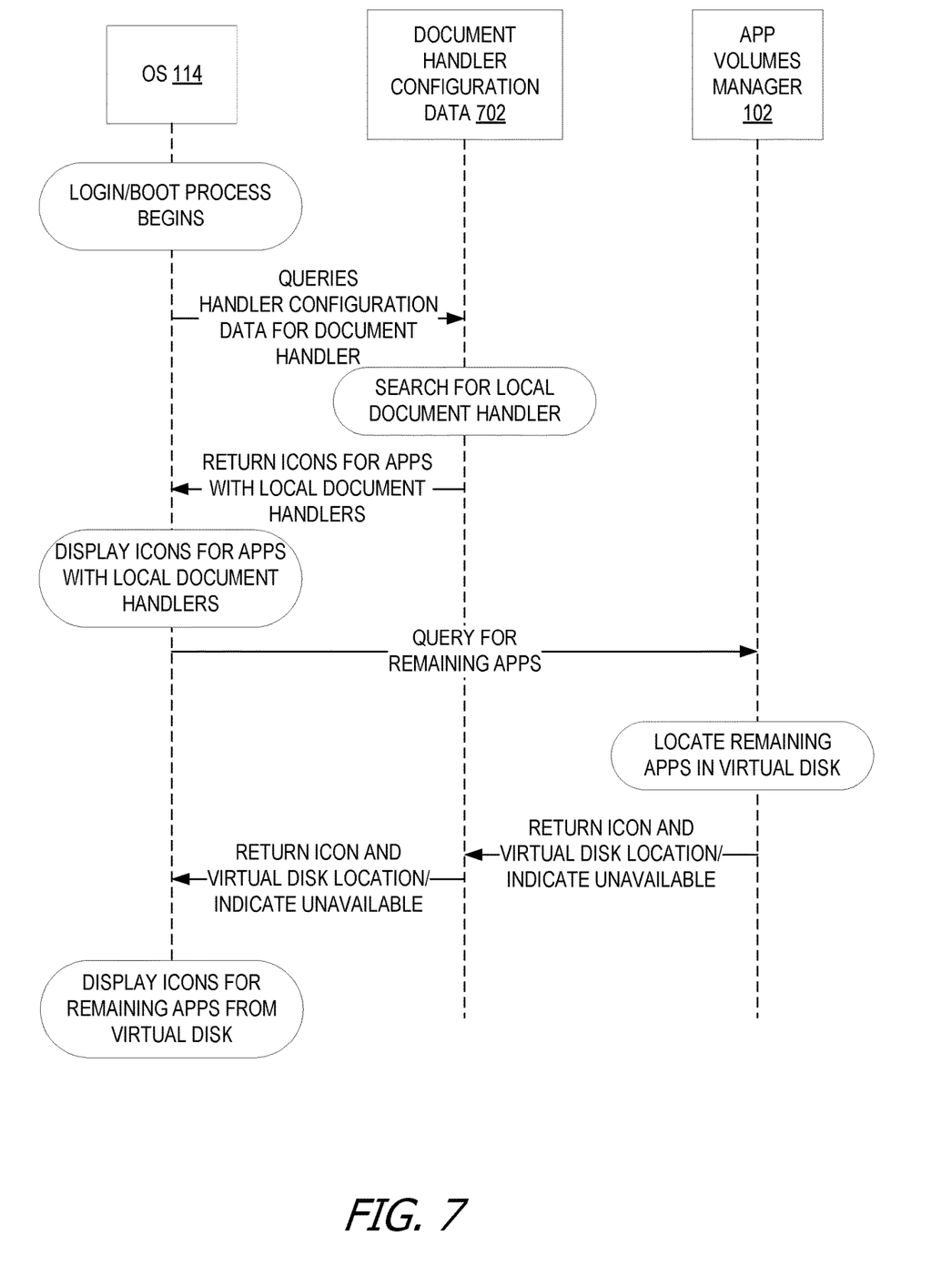
FIG. 7 is a sequence diagram illustrating the interaction of an operating system, document handler configuration data, and the application volumes manager during automatic document handling.

FIG. 7 is a sequence diagram illustrating the interaction of an operating system, document handler configuration data, and application volumes manager during automatic document handling. The disclosed method of automatic document handling allows files and applications to be represented to the user 502 as "available" even if the underlying application is not mounted to the disk subsystem 204. Initially, the OS 114 begins booting, or a user 502 logs into the system. The OS 114 then queries for a local document handler in the document handler configuration data 702. If, after searching for a local document handler for the various file types and applications the appropriate local document handlers are located, then the icons for those applications are returned for display by the OS 114. However, if the local document handlers cannot be found for some of the file types and applications, then the OS 114 queries the application volumes manager 102 for the remaining applications. If the application stacks 108 or virtual disks for the file types and applications exist, then the application volumes manager 102 returns the icons associated with the file types or applications. Otherwise, the application volumes manager 102 indicates that there are no available application stacks 108 or virtual disks associated with the file type or application. The OS 114 displays the appropriate icons, or when no icons are available, the grayed out or whited out rectangle indicating that an application or file type is "unavailable."

Figure 8:
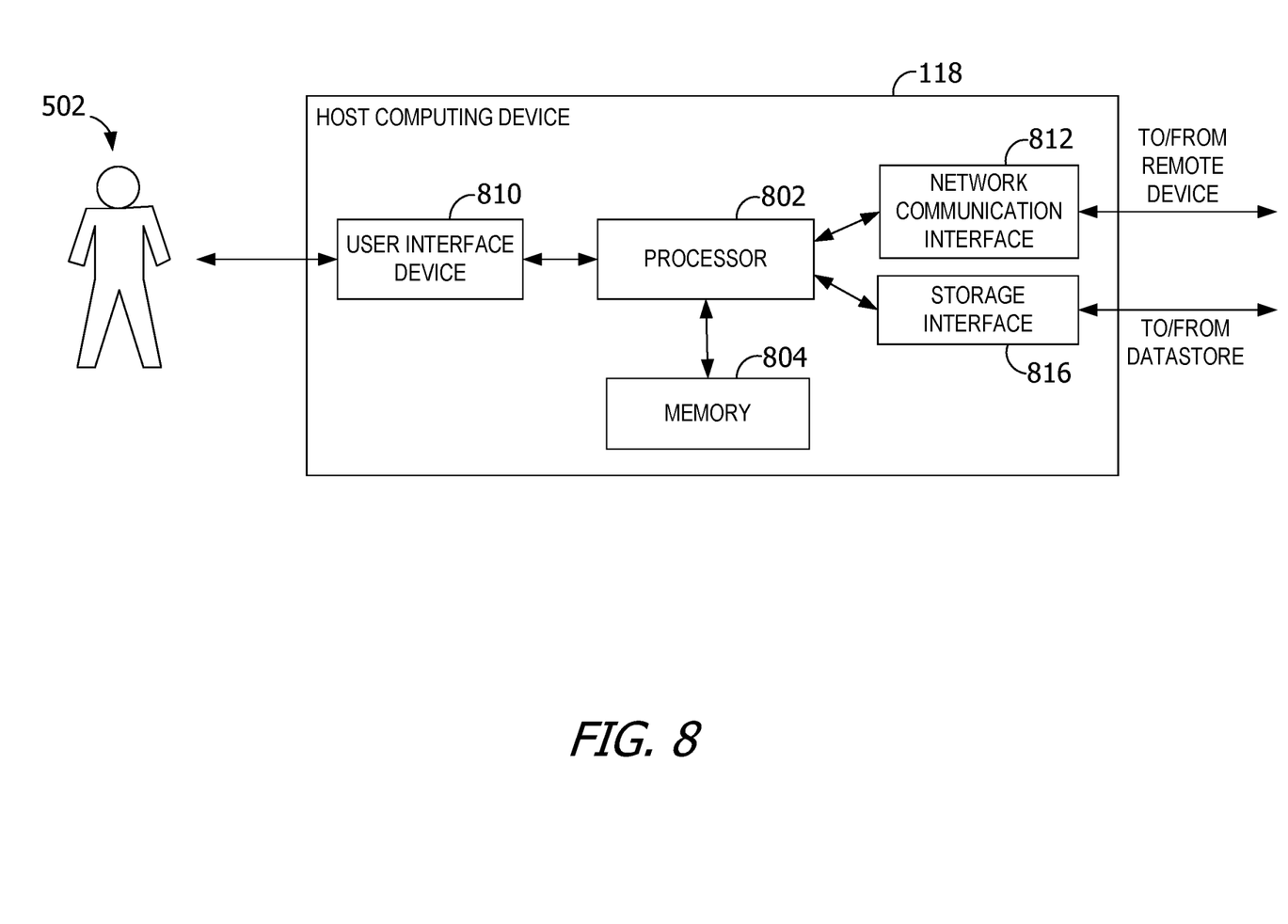
FIG. 8 is a block diagram of an exemplary host computing device.

FIG. 8 is a block diagram of an example host computing device 118. Host computing device 118 includes a processor 802 for executing instructions. In some examples, executable instructions are stored in a memory 804. Memory 804 is any device allowing information, such as executable instructions and/or other data, to be stored and retrieved. For example, memory 804 may include one or more random access memory (RAM) modules, flash memory modules, hard disks, solid state disks, and/or optical disks.

Host computing device 118 may include a user interface device 810 for receiving data from a user 502 and/or for presenting data to user 502. User 502 may interact indirectly with host computing device 118 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 502, while another device (e.g., a presentation device) operates to present data to user 502. In other examples, user interface device 810 has a single component, such as a touch screen, that functions to both output data to user 502 and receive data from user 502. In such examples, user interface device 810 operates as a presentation device for presenting information to user 502. In such examples, user interface device 810 represents any component capable of conveying information to user 502. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 802 and configured to be operatively coupled to an output device, such as a display device or an audio output device.

Host computing device 118 also includes a network communication interface 812, which enables host computing device 118 to communicate with a remote device (e.g., another computing device) via a communication medium, such as a wired or wireless packet network. For example, host computing device 118 may transmit and/or receive data via network communication interface 812. User interface device 810 and/or network communication interface 812 may be referred to collectively as an input interface and may be configured to receive information from user 502.

Host computing device 118 further includes a storage interface 816 that enables host computing device 118 to communicate with one or more data storage devices, which store virtual disk images, software applications, and/or any other data suitable for use with the methods described herein. In example examples, storage interface 816 couples host computing device 118 to a storage area network (SAN) (e.g., a Fibre Channel network) and/or to a network-attached storage (NAS) system (e.g., via a packet network). The storage interface 816 may be integrated with network communication interface 812.

Figure 9:
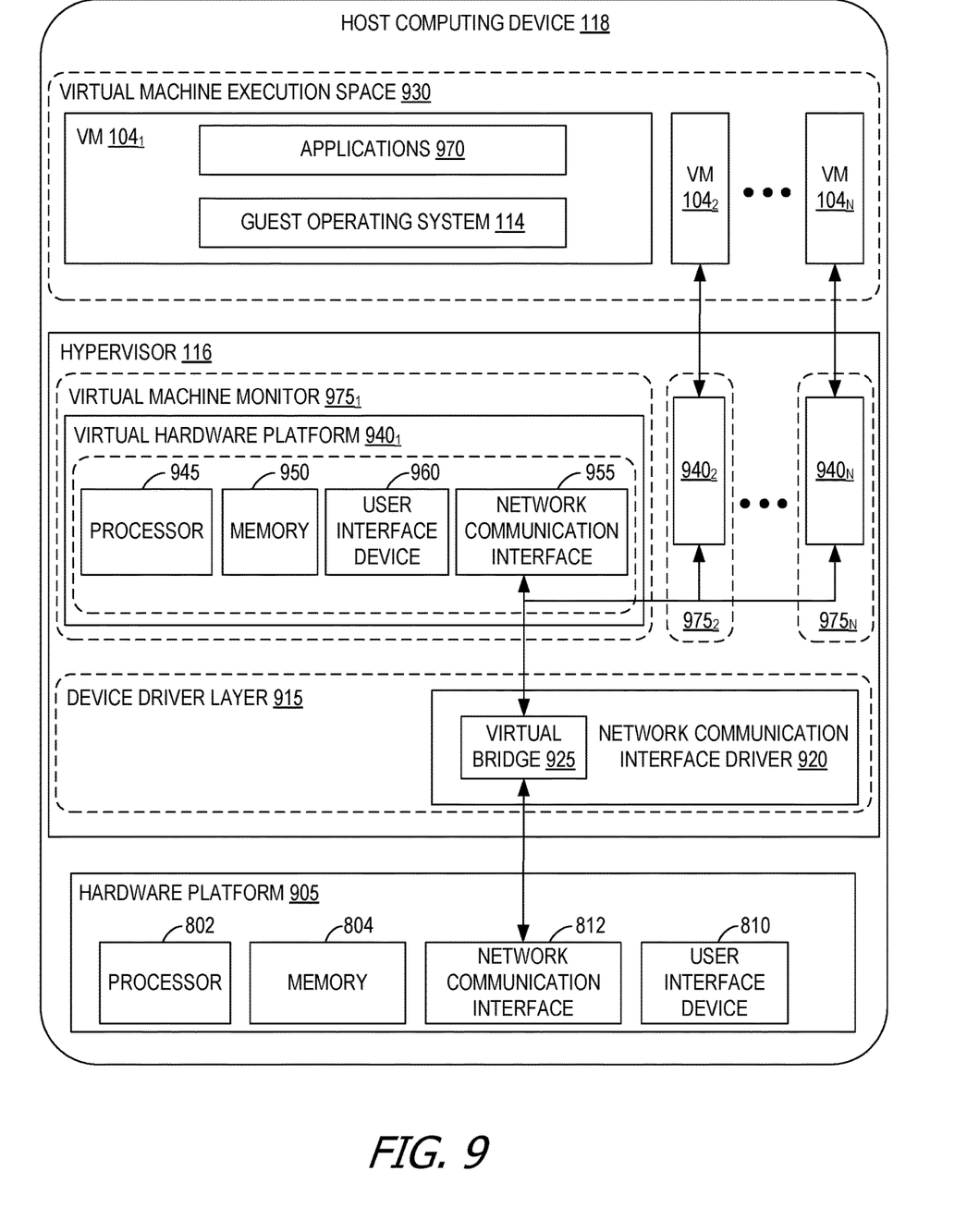
FIG. 9 is a block diagram of virtual machines that are instantiated on a computing device, such as the host computing device shown in FIG. 8.

FIG. 9 depicts a block diagram of virtual machines $104_1$, $104_2 \ldots 104_N$ that are instantiated on host computing device 118. Host computing device 118 includes a hardware platform 905, such as an x86 architecture platform. Hardware platform 905 may include processor 802, memory 804, network communication interface 812, user interface device 810, and other input/output (I/O) devices, such as a presentation device 806 (shown in FIG. 8). A virtualization software layer, also referred to hereinafter as a hypervisor 116, is installed on top of hardware platform 905.

The virtualization software layer supports a virtual machine execution space 930 within which multiple virtual machines (VMs $104_1$-$104_N$) may be concurrently instantiated and executed. Hypervisor 116 includes a device driver layer 915, and maps physical resources of hardware platform 905 (e.g., processor 802, memory 804, network communication interface 812, and/or user interface device 810) to "virtual" resources of each of VMs $104_1$-$104_N$ such that each of VMs $104_1$-$104_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM 104₁). Hypervisor 116 may manage (e.g., monitor, initiate, and/or terminate) execution of VMs 104₁-104$_N$ according to policies associated with hypervisor 116, such as a policy specifying that VMs 104₁-104$_N$ are to be automatically restarted upon unexpected termination and/or upon initialization of hypervisor 116. In addition, or alternatively, hypervisor 116 may manage execution VMs 104₁-104$_N$ based on requests received from a device other than host computing device 118. For example, hypervisor 116 may receive an execution instruction specifying the initiation of execution of first VM 104₁ from a management device via network communication interface 812 and execute the execution instruction to initiate execution of first VM 104₁.

In some examples, memory 950 in first virtual hardware platform 940₁ includes a virtual disk that is associated with or "mapped to" one or more virtual disk images stored on a disk (e.g., a hard disk or solid state disk) of host computing device 118. The virtual disk image represents a file system (e.g., a hierarchy of directories and files) used by first VM 104₁ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 118. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs 104₁-104$_N$). Each virtual communication interface for each VM 104₁-104$_N$, such as network communication interface 955 for first VM 104₁, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs 104₁-104$_N$. This configuration enables an Ethernet packet that has a virtual MAC address as its destination address to properly reach the VM in host computing device 118 with a virtual communication interface that corresponds to such virtual MAC address.

Virtual hardware platform 940₁ may function as an equivalent of a standard x86 hardware architecture such that any x86-compatible desktop operating system (e.g., MICROSOFT WINDOWS brand operating system, LINUX brand operating system, SOLARIS brand operating system, NETWARE, or FREEBSD) may be installed as guest operating system (OS) 114 in order to execute applications 970 for an instantiated VM, such as first VM 104₁. Virtual hardware platforms 940₁-940$_N$ may be considered to be part of virtual machine monitors (VMM) 975₁-975$_N$ that implement virtual system support to coordinate operations between hypervisor 116 and corresponding VMs 104₁-104$_N$. Those with ordinary skill in the art will recognize that the various terms, layers, and categorizations used to describe the virtualization components in FIG. 9 may be referred to differently without departing from their functionality or the spirit or scope of the disclosure. For example, virtual hardware platforms 940₁-940$_N$ may also be considered to be separate from VMMs 975₁-975$_N$, and VMMs 975₁-975$_N$ may be considered to be separate from hypervisor 116. One example of hypervisor 116 that may be used in an example of the disclosure is included as a component in VMware's ESX brand software, which is commercially available from VMware, Inc.

Additional Examples

The following scenarios are merely exemplary and not intended to be limiting in any way.

The operating system determines that a given document type is unhandled by querying the document extension registry which contains a list of handled extension along with the appropriate application for each extension. If the extension at hand is not listed in this registry, the operating system assumes that no locally installed application is available to handle the document open/edit events. In some examples, queries of the operating system document handler registry are intercepted and any query resulting in failure is passed to the application volumes manager which queries the managed applications (by searching the application stacks) for a matching handler application.

If application volume manager determines that it has such an application, and it is part of the secondary ring of handler applications to which the user in question is entitled, then the icon for the handler application is returned in the query results and transmitted into the original native operating system query result such that the document in question does not appear as the blank white 'unhandled' icon type, but instead displays the icon of the handler application identified by the application volumes query. In the event that no licenses are available, and the application cannot be executed, then an icon indicating it is unhandled is displayed.

This secondary ring of applications need not be initially represented on the user's application menu upon login, but upon first launch of a handled document type, our application volumes agent signals the application volumes manager to dynamically mount the identified handler application in the on-demand manner described in the 'On-Demand Application Delivery' section above.

This solution results in a user experience which allows users to download a document from the internet or from their email systems or web systems for which no locally installed application is present and yet immediately view the proper icon of the document's handler application (e.g., when they save it into their file system or view it within their email system). The solution identifies that the application volume is managing the needed application for the document and avoids any disruption to the user experience. Upon launching the document with a double-click action, application volumes automatically mounts the needed application in the background and opens the document.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the disclosure constitute exemplary means for displaying icons for unmounted applications, and mounting applications on demand. For example, the elements illustrated in FIG. 1, such as the application volumes manager 102 and the applications volumes agent 112, when encoded to perform the operations illustrated in FIGS. 3, 4, and 6, constitute exemplary means for retrieving and presenting to the user icons for document handlers which are available but unmounted, and for mounting those document handlers on-demand.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for automatic document handling on a machine, of an application which is not installed on the machine, said system comprising:
   a memory area that stores:
      an icon and a virtual disk, wherein both the icon and the virtual disk are associated with the application; and
      computer-executable instructions;
   a processor programmed to execute the computer-executable instructions to:
      after boot up of the machine:
         obtain the icon associated with the application;
         display the obtained icon upon representing the application; and
         receive a request from a user to launch the application;
      an application volumes filter driver configured to:
         intercept the request to launch the application; and
         upon intercepting the request to launch the application, determine that the application is not mounted to the machine; and
      an application volumes manager configured to, based on the determination that the application is not mounted to the machine, mount the virtual disk with the application on the machine and merge application content into a file system and a registry of an operating system (OS) associated with the machine, the merging allowing the application to launch on the machine, wherein the application volumes filter driver executes the application from the mounted virtual disk to provide access to the launched application.

2. The system of claim 1, wherein the merging is performed using file system and registry virtualization drivers.

3. The system of claim 1, wherein determining that the application is not mounted on the machine comprises determining that a license is available for the application.

4. The system of claim 1, wherein displaying the obtained icon upon representing the application comprises displaying the obtained icon as available but not mounted to the machine.

5. The system of claim 4, wherein displaying the obtained icon as available but not mounted to the machine comprises displaying the obtained icon grayed out.

6. The system of claim 1, wherein displaying the obtained icon comprises displaying the obtained icon on a desktop of the machine.

7. The system of claim 1, wherein the processor is programmed to dismount the virtual disk based on a license for the application expiring.

8. The system of claim 1, wherein upon mounting the virtual disk, the obtained icon is displayed as available and mounted.

9. A method for on-demand handling and mounting of an unmounted application on a machine, the method comprising:
after boot up of the machine:
receiving a request to launch an application;
intercepting, by an application volumes filter driver, the request to launch the application;
determining, by the application volumes filter driver, that the application is not mounted on the machine;
requesting, by the application volumes filter driver to an application volume manager, for a virtual disk that includes the application;
based on the request for the virtual disk, mounting, by the application volume manager, the virtual disk to the machine and merging application content into a file system and a registry of an operating system (OS) associated with the machine, the merging allowing the application to launch on the machine; and
based on the merging, executing the application from the mounted virtual disk.

10. The method of claim 9, further comprising:
receiving a request to launch a second application;
determining that no licenses for the second application are available; and
based at least on the determining that no licenses for the second application are available, causing a mounting of a virtual disk comprising the second application to fail.

11. The method of claim 9, wherein the merging is performed using file system and registry virtualization drivers.

12. The method of claim 9, further comprising:
dismounting the virtual disk upon the application becoming idle for more than a threshold amount of time.

13. The method of claim 9, further comprising:
recording each time the virtual disk is mounted to the machine and each time the virtual disk is dismounted from the machine;
identifying a pattern in the recording; and
based upon the identified pattern, mounting the virtual disk to the machine in anticipation of the request to launch the application.

14. The method of claim 9, further comprising:
recording each time the virtual disk is mounted to the machine and each time the virtual disk is dismounted from the machine;
identifying a pattern in the recording; and
based upon the identified pattern, reserving a license in anticipation of mounting the virtual disk.

15. The method of claim 9, further comprising:
determining a time lapse since a last file for the application was closed; and
based on the time lapse exceeding a predefined period of time, unmounting the application.

16. One or more non-transitory computer-readable storage media including computer-executable instructions that, when executed, cause at least one processor to mount a virtual disk corresponding to an application to a machine by:
after boot up of the machine:
receiving a request to launch an application;
intercepting the request to launch the application;
determining that the application is not mounted to the machine;
mounting a virtual disk that includes the application to a disk subsystem of the machine and merging application content into a file system and a registry of an operating system (OS) associated with the machine; and
based on the merging, executing the request to launch the application from the mounted virtual disk.

17. The one or more non-transitory computer-readable storage media of claim 16, wherein the computer-executable instructions further cause the processor to return an error to an operating system upon determining that there is no virtual disk associated with the application.

18. The one or more non-transitory computer-readable storage media of claim 16, wherein the request to launch the application includes one of the following: a request to download the application, a request to open the application, or a request to access an attribute of the application.

19. The one or more non-transitory computer-readable storage media of claim 16, wherein the computer-executable instructions further cause the processor to:
identify one or more privileged users; and
reserve a pool of licenses for the privileged users to access the application.

20. The one or more non-transitory computer-readable storage media of claim 16, wherein the merging is performed using file system and registry virtualization drivers.

* * * * *